(12) United States Patent
Auranen et al.

(10) Patent No.: US 8,817,626 B2
(45) Date of Patent: Aug. 26, 2014

(54) INTEROPERABILITY OF DIGITAL BROADCASTING AND CELLULAR COMMUNICATION SYSTEMS

(75) Inventors: Tommi Auranen, Turku (FI); Harri J. Pekonen, Raisio (FI); Jussi Vesma, Turku (FI); Jani Vare, Kaarina (FI); Pekka Talmola, Turku (FI); Jukka Henriksson, Espoo (FI); Visa Koivunen, Espoo (FI)

(73) Assignee: Nokia Corporation, Espoo (FI)

( * ) Notice: Subject to any disclaimer, the term of this patent is extended or adjusted under 35 U.S.C. 154(b) by 988 days.

(21) Appl. No.: 12/530,296

(22) PCT Filed: Mar. 8, 2007

(86) PCT No.: PCT/FI2007/050128
§ 371 (c)(1),
(2), (4) Date: Nov. 19, 2009

(87) PCT Pub. No.: WO2008/107511
PCT Pub. Date: Sep. 12, 2008

(65) Prior Publication Data
US 2010/0120467 A1 May 13, 2010

(51) Int. Cl.
*H04J 3/14* (2006.01)
*H04L 1/00* (2006.01)
*H03M 13/00* (2006.01)

(52) U.S. Cl.
USPC .......................... 370/236; 370/229; 714/780

(58) Field of Classification Search
USPC ........................................................ 370/236
See application file for complete search history.

(56) References Cited

U.S. PATENT DOCUMENTS

| | | | | |
|---|---|---|---|---|
| 6,289,000 | B1 * | 9/2001 | Yonge, III | 370/203 |
| 6,721,439 | B1 * | 4/2004 | Levy et al. | 382/100 |
| 6,892,076 | B2 | 5/2005 | Maalismaa et al. | |
| 7,477,915 | B2 | 1/2009 | Leinonen et al. | |
| 7,620,120 | B2 | 11/2009 | Auranen | |
| 7,796,560 | B2 | 9/2010 | Rousu et al. | |
| 7,830,957 | B2 * | 11/2010 | Bai et al. | 375/240 |
| 7,865,167 | B2 | 1/2011 | Leinonen et al. | |
| 2005/0141644 | A1 * | 6/2005 | Sadowsky | 375/324 |
| 2005/0254587 | A1 * | 11/2005 | Kim et al. | 375/260 |
| 2006/0120311 | A1 * | 6/2006 | Berkovich | 370/310 |

(Continued)

FOREIGN PATENT DOCUMENTS

EP 1255408 A1 11/2002
EP 1361719 A2 11/2003

(Continued)

OTHER PUBLICATIONS

ETSI EN 300 744 v1.5.1 (Jun. 2004) Annex F; Additional Features for DVB Handheld Terminals (DVB-H), pp. 50-60.

(Continued)

*Primary Examiner* — Shaq Taha
(74) *Attorney, Agent, or Firm* — Harrington & Smith

(57) ABSTRACT

In a digital broadband broadcast transmitter, digital data is time interleaved for transmission, and the time interleaved digital data is transmitted in a digital broadband broadcast transmission towards a plurality of receivers. A cellular transmitter is operated in an apparatus. In the same apparatus, the digital broadband broadcast transmission transmitted by the digital broadband broadcast transmitter is received, and the received digital broadband broadcast transmission is time deinterleaved.

12 Claims, 11 Drawing Sheets

(56) References Cited

U.S. PATENT DOCUMENTS

| | | | |
|---|---|---|---|
| 2006/0135083 A1 | 6/2006 | Leinonen et al. | |
| 2006/0171412 A1* | 8/2006 | Kanterakis | 370/464 |
| 2006/0197538 A1 | 9/2006 | Leinonen et al. | |
| 2007/0064835 A1 | 3/2007 | Auranen et al. | |
| 2007/0066228 A1 | 3/2007 | Leinonen et al. | |
| 2007/0189402 A1 | 8/2007 | Yang | |
| 2007/0280387 A1* | 12/2007 | Li et al. | 375/347 |
| 2009/0023404 A1 | 1/2009 | Leinonen et al. | |
| 2010/0120467 A1 | 5/2010 | Auranen et al. | |
| 2010/0297948 A1 | 11/2010 | Rinne et al. | |

FOREIGN PATENT DOCUMENTS

| | | |
|---|---|---|
| EP | 1361720 A1 | 11/2003 |
| EP | 1608094 A1 | 12/2005 |
| WO | 03073683 A1 | 9/2003 |
| WO | 03105386 A2 | 12/2003 |
| WO | 2004110088 A1 | 12/2004 |
| WO | 2006006833 A1 | 1/2006 |
| WO | 2007034037 A1 | 3/2007 |
| WO | 2007060504 A2 | 5/2007 |
| WO | 2008027616 A1 | 3/2008 |
| WO | 2008152181 A1 | 12/2008 |

OTHER PUBLICATIONS

"International Search Report and the Written Opinion of the International Searching Authority", received in corresponding PCT Application No. PCT/FI2007/050128, Dated Dec. 10, 2007, 11 pages.

International Search Report and Written Opinion of the International Searching Authority for PCT Application No. PCT/FI2009/050183, dated Dec. 4, 2009, 14 pages.

Hazmi et al., "Mitigation Techniques for High Power and Long Duration Interference in DVB-T/H Systems", The 18th Annual IEEE International Symposium on Personal, Indoor and Mobile Radio Communications (PIMRC'07).

Office Action received from Korean Patent Application No. 10-2009-7025609, dated Mar. 18, 2011, 7 pages.

"International Search Report and the Written Opinion of the International Searching Authority", received in corresponding PCT Application No. PCT/FI2007/050359, dated Dec. 18, 2008, 11 pages.

Office Action received from Korean Patent Application No. 10-2009-7020939, dated Feb. 14, 2011, 12 pages.

Walter Fischer: "Digitale Fernsehtechnik in Thorie and Praxis", Jan. 2, 2006, Springer Berlin ISBN:3540292039 p. 4, 515.

W. Fisher, R. Kirchoss, T. Tobergte, W. Durport, T. Rosner: "Test of DVB-H-Capable Mobile Phones in development and Production", Rhode & Schwarz Application Note Apr. 1, 2005, pp. 1-41.

* cited by examiner

INTEROPERABILITY OF DIGITAL BROADCASTING AND CELLULAR COMMUNICATION SYSTEMS

RELATED APPLICATION

This application was originally filed as PCT Application No. PCT/FI2007/050128 filed Mar. 8, 2007.

FIELD OF THE INVENTION

The present invention generally relates to interoperability of digital broadband broadcasting and cellular communication systems. The invention relates particularly, though not exclusively, to interoperability of digital broadband broadcasting and time division multiple access (TDMA) based cellular communication systems.

BACKGROUND OF THE INVENTION

The number of different wireless communication services and systems has increased during last years, and intensive development for new services is continuing. Several different cellular networks are in use. Examples of different cellular networks include GSM (Global System for Mobile communication), PCS (Personal Communications Services) and $3^{rd}$ generation mobile communication networks. These networks may use different frequency bands in different parts of the world. In addition to cellular telecommunications, other wireless services have been developed. Examples of such wireless services include digital broadband broadcasting, such as DVB-T (Digital Video Broadcasting-Terrestrial) and DVB-H (Digital Video Broadcasting-Handheld) providing digital television transmission and reception.

Many modern terminals are already configured to support more than one wireless service. For example, terminals operating in time division multiple access systems, such as GSM, are also capable of receiving digital broadband broadcast transmissions, such as DVB-H transmissions.

One of the problems in designing terminals supporting more than one wireless service is that the frequency bands supported by the services may be close to each other or, in some cases, even overlap. Thus, when the user of the terminal is using a first wireless service, communication using a second service may cause interference to the first service.

For example in the USA, a channel for a DVB-H service is allocated at frequency band of 1670 to 1675 MHz. In Europe, a frequency band allocation for the DVB-T and DVB-H service extends from 470 to 862 MHz in the ultrahigh frequency (UHF) band. It is also possible that future implementations in Europe and in the USA may utilize frequencies in higher or lower UHF frequencies as well. The frequency allocations are problematic since the cellular operation may cause in the terminal strong interference to the DVB-H reception, for example, if both of these services are operated simultaneously. For example, wideband noise of a transmitter operating in a GSM 900 or Extended GSM (EGSM) system (the transmission frequency range in these systems extends from 880 MHz to 890 MHz (EGSM) or from 890 MHz to 915 MHz (GSM 900)) desensitizes the uppermost DVB-T/H reception channels in Europe and wideband noise of PCS band transmission (1850 to 1990 MHz) desensitizes the DVB-H reception in the USA.

The interference problem is especially evident in terminals supporting both digital broadband broadcast reception and time division multiple access cellular services. The normal operation of a cellular transceiver may cause interference to the digital broadband broadcasting reception. More closely this means that the cellular transceiver typically transmits broadband noise in addition to the wanted signal. The broadband noise couples via a cellular antenna to a digital broadband broadcast reception antenna, folds on top of the digital broadband broadcast reception frequencies, and disturbs or even prevents reception. Another problem is that even the wanted cellular transmission signal can produce a blocking effect in digital broadband broadcast reception if the cellular transmission band is very close to the digital broadband broadcast transmission band making the transition band between the digital broadband broadcasting and cellular systems very short.

Broadband noise is typically produced by a power amplifier in the cellular receiver. In many cases, the broadband noise produced, for example, by the GSM transceiver is in-band interference, for example, for a DVB-H receiver and cannot be anymore filtered in the DVB-H receiver. The broadband noise has been suggested to be filtered in the cellular transceiver. In accordance with current understanding, however, it is not seen practically possible to make a filter which would be steep enough with low enough loss for cellular operation. Similarly, concerning the wanted cellular transmission signal near the digital broadband broadcast reception band, making a steep enough input filter which would filter the wanted cellular transmission signal in the digital broadband broadcast receiver is considered problematic or even impossible. According to another suggestion to reduce interference the use of block periods has been proposed. The intention was to block cellular transmission during digital broadband broadcast reception in order to avoid interference. However, the use of block periods in the conventional cellular systems would typically lead into irrecoverable damages in the quality of the cellular signal in certain services, such as voice calls.

SUMMARY

According to a first aspect of the invention there is provided an apparatus, comprising:
  a digital broadband broadcast receiver configured to receive digital data in a digital broadband broadcast transmission from a digital broadband broadcast transmitter; and
  a cellular transmitter configured to transmit to a cellular network, wherein the apparatus further comprises:
  a time deinterleaver configured to time deinterleave the received digital data.

In an embodiment, the time deinterleaver is configured to time deinterleave received digital data, which digital data has been time interleaved so that digital data corresponding to an OFDM symbol has been spread across more than one OFDM symbol time.

In an embodiment, the time deinterleaver is configured to time deinterleave received digital data, which digital data has been time interleaved by using an interleaving length which is at least as long as a transmission cycle of an interfering transmission cycle period.

In an embodiment, the digital broadband broadcast receiver is configured to use a first code in channel decoding or to use an additional redundancy added by a digital broadband broadcast transmitter to recover at least part of the errors generated by an interference from the cellular time division multiple access transmission, wherein the first code is stronger than a code that is used for channel coding, when an interference from a cellular time division multiple access transmission is not expected.

In an embodiment, the digital broadband broadcast receiver is configured to apply reliability scaling to received digital data in proportion to a detected or signaled cellular interference.

In an embodiment, the apparatus comprises a GSM or other time division multiple access transmitter and a digital video broadcasting receiver.

According to a second aspect of the invention there is provided an apparatus, comprising:
a digital broadband broadcast transmitter configured to transmit digital data towards a plurality of digital broadband broadcast receivers; and
a time interleaver configured to time interleave the digital data for transmission.

In an embodiment, the time interleaver is configured to interleave digital data corresponding to an OFDM symbol across more than one OFDM symbol time.

In an embodiment, the time interleaver is configured to interleave in time dimension bits, bytes or n-bit long data words corresponding to an OFDM symbol.

In an embodiment, the time interleaver is configured to time interleave digital data right after an inner interleaver or a frequency interleaver. Further in an embodiment, the time interleaver is configured to time interleave digital data right after an inner interleaver and before a mapper which maps the time interleaved data into the signal constellations.

In an embodiment, the time interleaver is configured to use an interleaving length which is at least as long as a transmission cycle of an interfering transmission cycle period.

In an embodiment, the apparatus is configured to use a first code in channel coding or to add redundancy to recover at least part of the errors that are generated by an interference from a cellular time division multiple access transmission, wherein the first code is stronger than a code that is used for channel coding, when an interference from a cellular time division multiple access transmission is not expected.

According to a third aspect of the invention there is provided a method, comprising:
operating a cellular transmitter in an apparatus;
receiving in the same apparatus digital data in a digital broadband broadcast
transmission from a digital broadband broadcast transmitter; and
time deinterleaving the received digital data According to a fourth aspect of the invention there is provided a computer readable medium having stored thereon a computer program executable in an apparatus, the computer program comprising:
program code for operating a cellular transmitter in the apparatus;
program code for receiving in the apparatus digital data in a digital broadband broadcast transmission from a digital broadband broadcast transmitter; and
program code for time deinterleaving the received digital data.

According to a fifth aspect of the invention there is provided a method, comprising:
time interleaving digital data for transmission; and
transmitting the time interleaved digital data in digital broadband broadcast transmission towards a plurality of digital broadband broadcast receivers.

According to a sixth aspect of the invention there is provided a computer readable medium having stored thereon a computer program executable in an apparatus, the computer program comprising:
program code for time interleaving digital data for transmission; and program code for transmitting the time interleaved digital data in digital broadband broadcast transmission towards a plurality of digital broadband broadcast receivers.

According to a seventh aspect of the invention there is provided an apparatus, comprising:
means for receiving digital data in a digital broadband broadcast transmission from a digital broadband broadcast transmitter; and
means for transmitting to a cellular network, wherein the apparatus further comprises:
means for time deinterleaving the received digital data.

According to an eighth aspect of the invention there is provided an apparatus, comprising:
means for transmitting digital data towards a plurality of digital broadband broadcast receivers; and
means for time interleaving the digital data for transmission.

According to a ninth aspect of the invention there is provided a time interleaver module comprising:
at least one input for receiving digital data to be transmitted by a digital broadcast broadband transmitter;
a time interleaver for time interleaving the digital data; and
at least one output for outputting the time interleaved digital data for further processing.

According to a tenth aspect of the invention there is provided a time deinterleaver module comprising:
at least one input for receiving digital data received by a digital broadcast broadband received;
a time deinterleaver for time deinterleaving the digital data; and
at least one output for outputting the time deinterleaved digital data for further processing.

In an embodiment, the time interleaver module and time deinterleaver module are implemented as hardware blocks with firmware or software control.

Time interleaving and time deinterleaving reduce the interfering effect caused by bursty cellular transmissions on simultaneous digital broadband broadcast reception. Advantages of an embodiment include improved GSM voice call interoperability with DVB-H reception above frequencies 750 MHz. DVB-H reception between the allocated UHF frequencies 750-862 MHz becomes easier when GSM 900 or EGSM interoperability with DVB-H reception is required.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

In the following description the DVB-H system is used as an example of a digital broadband broadcast system, and the GSM system is used as an example of a cellular communication system. DVB-H (and DVB-T) systems are orthogonal frequency division multiplexing (OFDM) based multicarrier modulation systems currently defined in the standards specification ETSI EN 300 744.

Examples of other applicable digital broadband broadcast systems include, inter alia, the following: Digital Video Broadcast-Terrestrial (DVB-T), Integrated Services Digital Broadcasting-Terrestrial (ISDB-T); 1seg, Digital Multimedia Broadcast-Terrestrial/Handheld (DMB-T/H), Terrestrial Digital Multimedia Broadcasting (T-DMB), Digital Audio Broadcasting (DAB), Digital Radio Mondiale (DRM), Forward Link Only (FLO), MediaFLO, Multimedia Broadcast Multicast Service (MBMS) of $3^{rd}$ generation partnership project (3GPP), Broadcast and Multicast Services (BCMCS) of $3^{rd}$ generation partnership project 2 (3GPP2), and data broadcast systems in accordance with Advanced Television Systems Committee (ATSC) Data Broadcast Standard. Examples of other applicable cellular communication systems are, for example, Digital-Advanced Mobile Phone Service (D-AMPS), Personal Digital Cellular (PDC) and many more.

Figure 1:
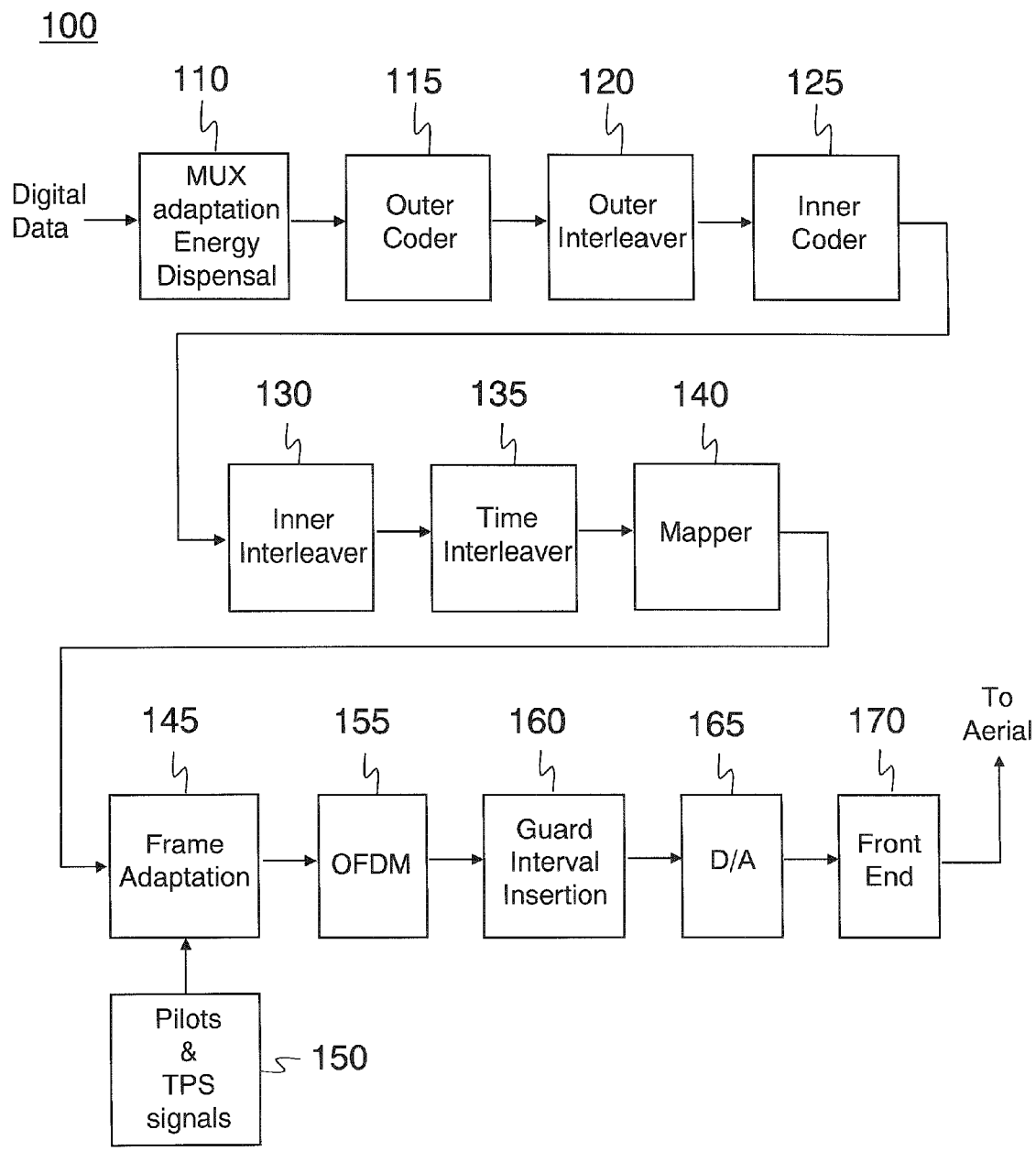
FIG. 1 shows a digital broadband broadcast transmitter in accordance with an embodiment.

FIG. 1 shows blocks of a DVB-T/H transmitter 100 (hereinafter referred to as broadband broadcast transmitter 100) according to an embodiment.

Multiplexed digital data to be transmitted is first inputted to block 110 for adaptation and randomization for energy dispersal. Next the digital data is conveyed to an outer coder 115 which Reed-Solomon encodes the digital data. An outer interleaver 120 carries out convolutional interleaving on the digital data. An inner coder 125 codes the digital data with the aid of punctured convolutional code. An inner interleaver 130 comprises the appropriate bit and symbol interleavers and performs frequency interleaving on the digital data. After frequency interleaving, digital data is fed into time interleaver 135 for time interleaving. The time interleaving may be performed bit-wise, byte-wise or word-wise, i.e., the units of digital data which are interleaved in time may be bits, bytes and/or n-bit long data words. Time interleaved digital data is conveyed to a mapper 140, which maps the time interleaved data into a chosen signal constellation. A frame adaptation block 145 organizes the signal to be transmitted into frames and adds to the frames pilot signals carriers for transmission parameter signalling data which are received from block 150. An OFDM (Orthogonal Frequency Division Multiplexing) modulator 155 performs OFDM modulation on the signal. A guard interval insertion block 160 inserts a guard interval in the beginning of each OFDM-symbol. A digital-to-analog converter 165 converts the signal from digital to analog domain. A front end 170 takes care of the transmission of the transmitted DVB-T/H signal via an antenna (Aerial).

It should be noted that although the time interleaver has been drawn as a separate block 135 in FIG. 1 between the inner interleaver 130 and the mapper 140, the time interleaving operation may alternatively be implemented with the frequency interleaving or after the frequency interleaving in the inner interleaver 130. In the embodiment in which time interleaving is carried out in the inner interleaver block 130 one alternative is to perform it in a symbol interleaver (not shown) comprised by the inner interleaver 130.

Figure 2:
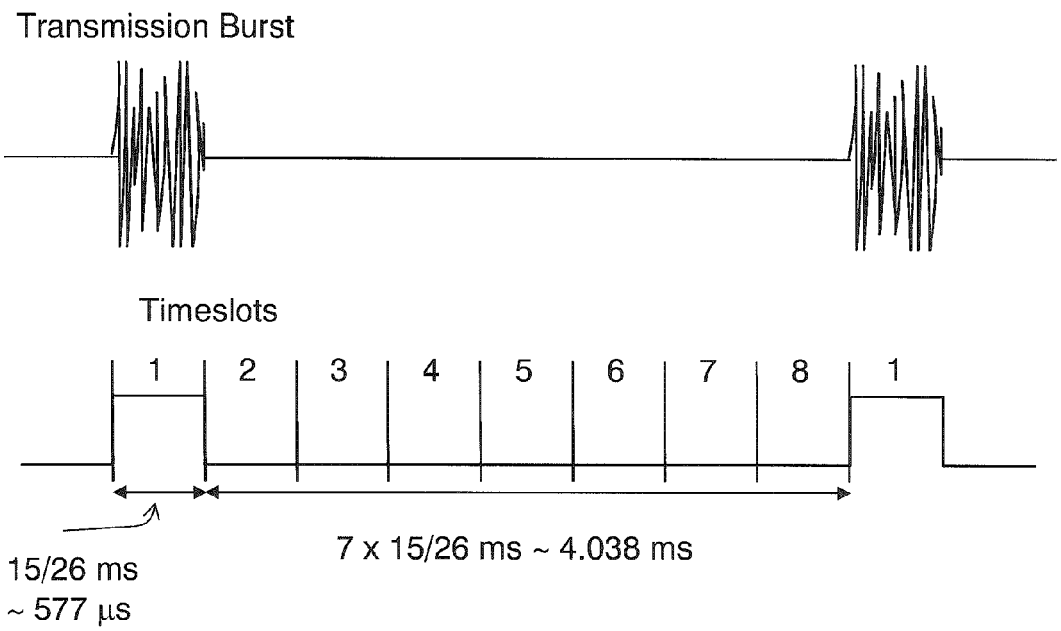
FIG. 2 shows the transmission bursts that are produced by a cellular transmitter in a time division multiple access system.

FIG. 2 shows schematically the transmission bursts that are produced by a cellular transmitter in a time division multiple access (TDMA) system. Transmission in TDMA systems is arranged in time slots. In the GSM system, in the air interface is used a TDMA frame of 120/26 ms, approximately 4.615 ms that has been divided into eight time slots (timeslots 1-8 in FIG. 2), each being 15/26 ms or about 577 μs long. A physical channel, that is, a series of regularly spaced timeslots on one or more frequencies may be allocated to a terminal for transmission. A physical channel comprises one timeslot in each consecutive TDMA frame. Alternatively, more than one time slot per one TDMA frame can be allocated. In the case shown in FIG. 2, the GSM transmitter transmits bursts in one time slot (time slot 1).

Figure 3:
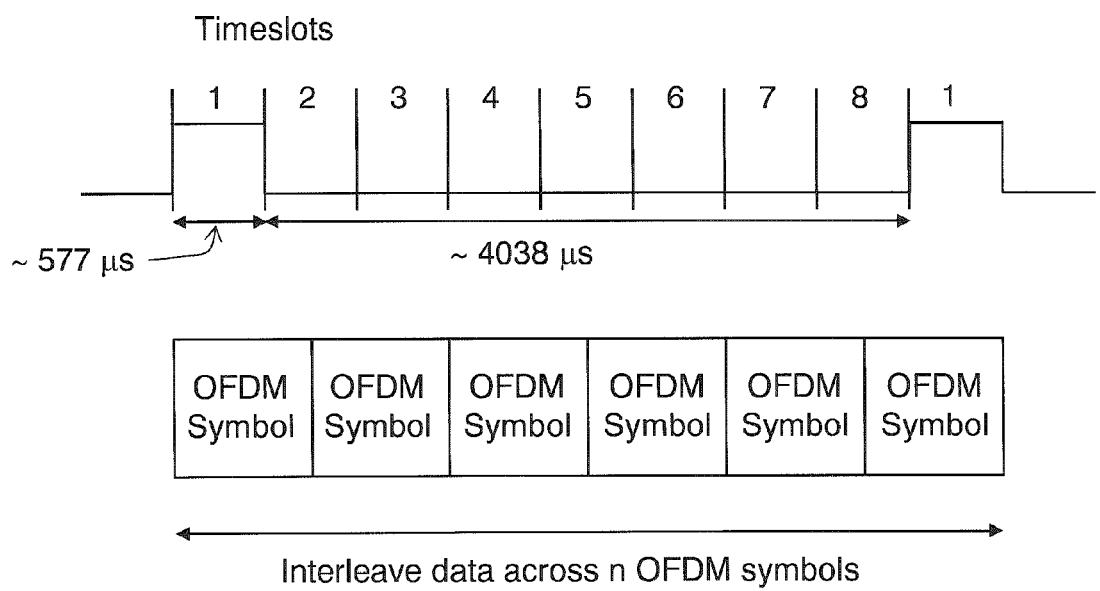
FIG. 3 shows interleaving in accordance with an embodiment.

FIG. 3 shows time interleaving in accordance with an embodiment. In order to cope with in-band broadband noise produced by the cellular transmitter in a digital broadband broadcast system, the digital data to be transmitted is interleaved in time. In an embodiment, time interleaving is done in the time interleaver block 135 of the broadband broadcast transmitter 100 shown in FIG. 1. The idea is to interleave digital data carried in each OFDM symbol across more than one OFDM symbol (n OFDM symbols). Long enough time interleaving is performed so that the interfering cellular noise burst energy is spread (preferably evenly) across symbols. When selecting what is "long enough" the cellular TDMA time slot structure is taken into account. In an embodiment, a time interleaver is selected to be at least as long as one cellular burst cycle or transmission cycle period, e.g., one TDMA period. In the case of GSM, the TDMA period is a TDMA frame whose length equals the length of 8 time slots, that is, around 4.615 ms.

In an embodiment, the interleaving length of the time interleaver (physical layer interleaver) is 4.615 ms or more. The amount of OFDM symbols across which the digital data in these symbols (and interfering energy) is spread depends on the length of the OFDM symbols. With short symbols more symbols should be used in the time interleaver.

There are several parameters that have an effect on the OFDM symbol length and, therefore, they also define the time interleaving length. These parameters are (the values are for the present DVB-T/H system):

FFT (Fast Fourier Transform) size: 2K, 4K or 8K guard interval: ¼, ⅛, 1/16 or 1/32 (calculated from the duration of the symbol part of an OFDM symbol)

channel bandwidth: 5 MHz, 6 MHz, 7 MHz or 8 MHz.

Therefore, there are currently altogether 3×4×4=48 different OFDM symbol lengths. The following table shows the symbol durations $T_s$ for 2K and 8K modes for 8 MHz channel bandwidth according to ETSI standard EN 300 744 V1.5.1 (2004-06); Digital Video Broadcasting (DVB); Framing structure, channel coding and modulation for digital terrestrial television.

| | Mode | | | | | | | |
|---|---|---|---|---|---|---|---|---|
| | 8K mode | | | | 2K mode | | | |
| | Guard interval $\Delta/T_U$ | | | | | | | |
| | 1/4 | 1/8 | 1/16 | 1/32 | 1/4 | 1/8 | 1/16 | 1/32 |
| Duration of symbol part $T_U$ | 8 192 × T 896 μs (note) | | | | 2 048 × T 224 μs (note) | | | |
| Symbol duration $T_S = \Delta + T_U$ | 10 240 × T = 1 120 μs | 9 216 × T = 1 008 μs | 8 704 × T = 952 μs | 8 448 × T = 924 μs | 2 560 × T = 280 μs | 2 304 × T = 252 μs | 2 176 × T = 238 μs | 2 112 × T = 231 μs |

The parameter T refers to an elementary period, which equals 7/64 μs for 8 MHz channels. Having in mind that the length of the time interleaving should be at least 4615 μs, the following table shows the resulting interleaving length for 8K mode and 8 MHz channel bandwidth.

| Guard interval | Symbol duration $T_s$ [μs] | Number of interleaved OFDM symbols | Resulting interleaving length [μs] |
|---|---|---|---|
| 1/4 | 1120 | 5 | 5600 |
| 1/8 | 1008 | 5 | 5040 |
| 1/16 | 952 | 5 | 4760 |
| 1/32 | 924 | 5 | 4620 |

In this example, time interleaving should be performed over five consecutive OFDM symbols so that the interleaving length exceeds 4615 μs for every guard interval value.

Similarly, the following table shows the resulting interleaving length for 2K mode and 8 MHz channel bandwidth.

| Guard interval | Symbol duration $T_s$ [μs] | Number of interleaved OFDM symbols | Resulting interleaving length [μs] |
|---|---|---|---|
| 1/4 | 280 | 17 | 4760 |
| 1/8 | 252 | 19 | 4788 |
| 1/16 | 238 | 20 | 4760 |
| 1/32 | 231 | 20 | 4620 |

Now, depending on the guard interval, time interleaving should be performed over 17, 19 or 20 consecutive OFDM symbols in order to have longer time interleaving than 4615 μs.

In the preceding, actions performed in the broadband broadcast transmitter 100 have been discussed. The following description concentrates more on the receiver side.

Figure 4:
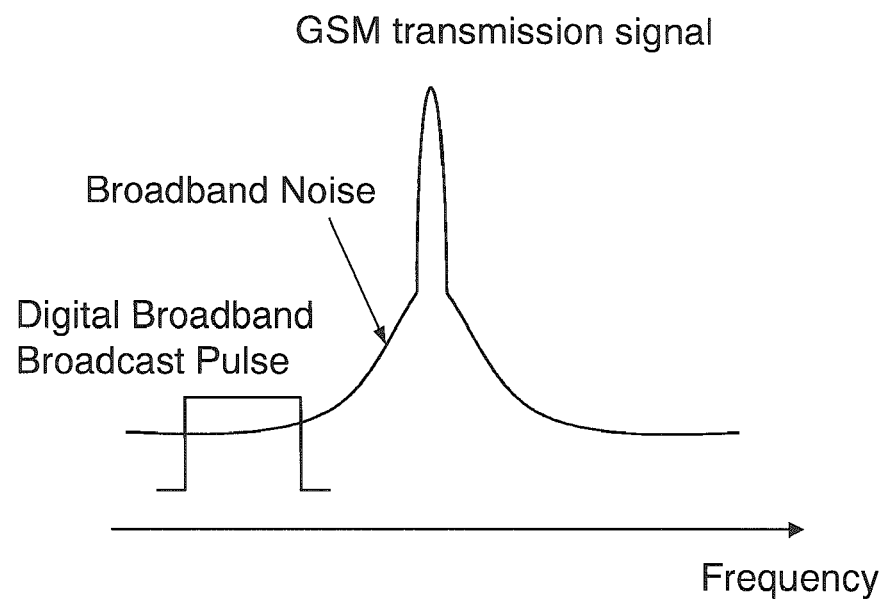
FIG. 4 shows broadband noise produced by a cellular power amplifier.

FIG. 4 shows schematically a cellular (in the illustrated example: GSM) transmission signal with broadband noise produced by a cellular power amplifier in a terminal device during cellular transmission as well as a digital broadband broadcast signal/pulse in frequency domain. The broadband noise in an apparatus interferes the simultaneous digital broadband broadcast reception in the same apparatus.

Figure 5:
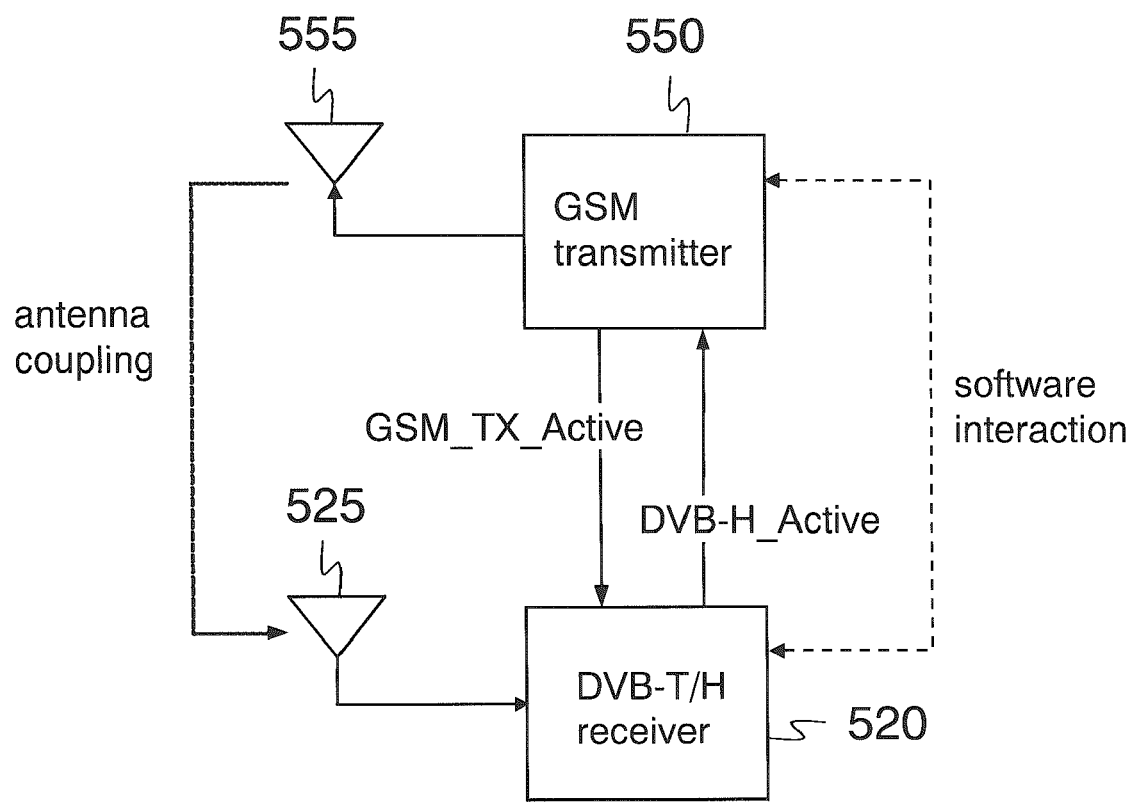
FIG. 5 shows noise coupling and activity signals.

FIG. 5 shows noise coupling in a receiving digital broadband broadcast apparatus in more detail. The broadband noise produced by the cellular transmitter 550 of the apparatus is coupled via the cellular antenna 555 to the digital broadband broadcast reception antenna 525 (by antenna coupling), and therefrom to the digital broadband broadcast receiver 520 resulting in interference in digital broadband broadcast reception. It has been suggested to have signaling between the cellular transmitter 550 and digital broadband broadcast receiver 520. These signals may comprise a first signal (here: DVB-H_ACTIVE) transmitted from digital broadband broadcast receiver 520 (here: DVB-H receiver) to cellular transmitter 550 (here: GSM transmitter) signaling to cellular transmitter 550 when digital broadband broadcast reception (here: DVB-H reception) is active, and second signal (here: GSM_TX_ACTIVE) transmitted from cellular transmitter 550 to digital broadband broadcast receiver 520 signaling to digital broadband broadcast receiver 520 when cellular transmitter 550 is active. In an embodiment, transmitting and processing of these activity signals or activity information data may comprise software based interaction between the cellular transmitter 550 and digital broadband broadcast receiver 520. In an embodiment these signals originate from a processor in the receiving apparatus controlling the operation of the GSM transmitter and DVB-T/H receiver.

Figure 6:
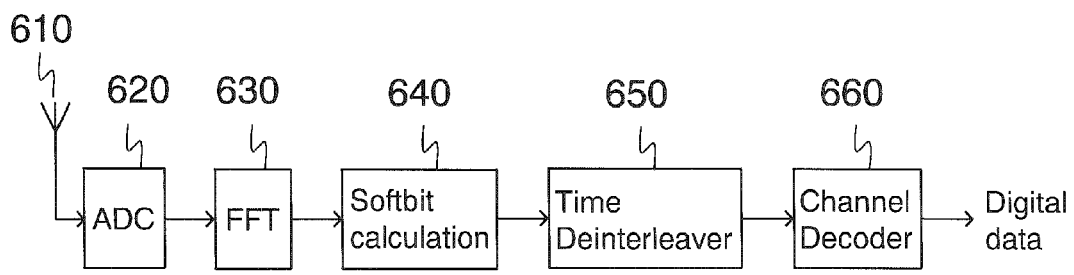
FIG. 6 shows a digital broadband broadcast receiver in accordance with an embodiment.

FIG. 6 shows selected operational blocks of a DVB-T/H receiver 600 (hereinafter referred to as broadband broadcast receiver 600) according to an embodiment of the invention.

The broadband broadcast receiver 600 comprises a front end (not shown) which receives the transmitted signal via an antenna 610. An analog-to-digital converter 620 converts the received signal from analog to digital domain. In FFT (Fast Fourier Transform) block 630 a Fast Fourier Transform is performed on the received signal. In a softbit calculation block 640 softbits are generated for evaluating the reliability of the received digital data. In a time deinterleaver 650, time deinterleaving is performed on the digital data which was time interleaved in a digital broadband broadcast transmitter. Time deinterleaving is an inverse operation of time interleaving, in which digital data was spread over more than one OFDM symbol. Time interleaving and time deinterleaving reduce the interfering effect caused by bursty cellular transmissions on digital broadband broadcast reception, since time interleaving and deinterleaving cause the interfering burst transmissions to spread over a plurality of OFDM symbols. After time deinterleaving, channel decoding is continued in a channel decoder 660 starting from inner deinterleaving and inner decoding (not shown) followed by outer deinterleaving and outer decoding (not shown). Channel decoded digital data is output from the channel decoder 660 for further processing.

Figure 7:
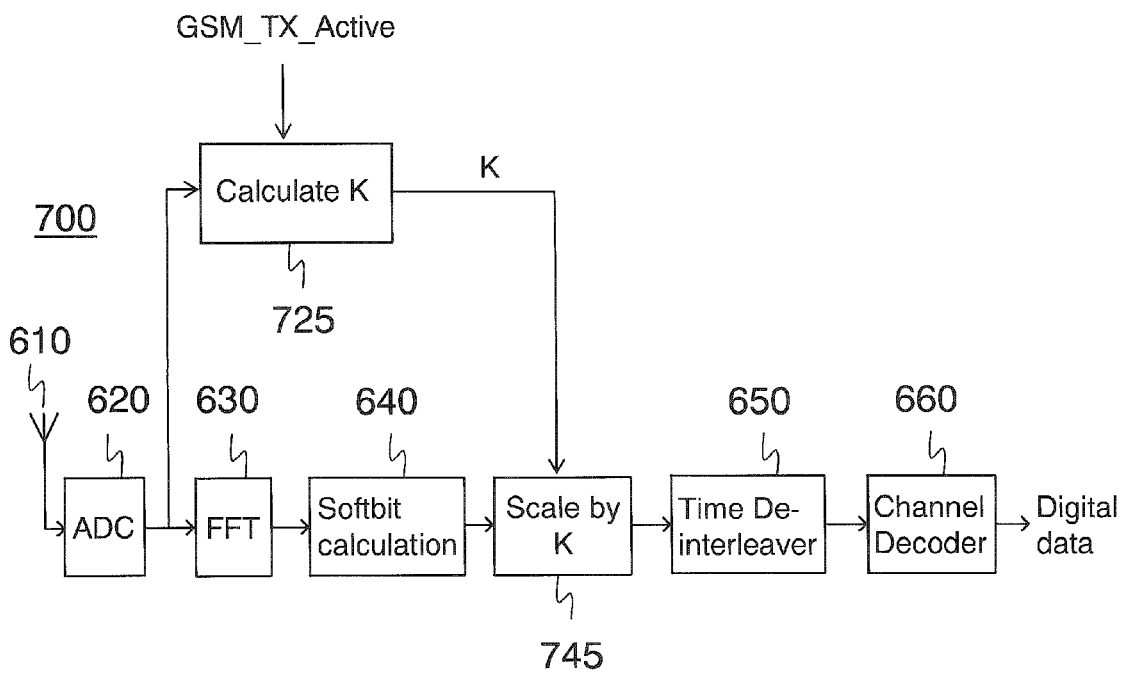
FIG. 7 shows a digital broadband broadcast receiver in accordance with another embodiment.

FIG. 7 shows an embodiment of the broadband broadcast receiver 600. The broadband broadcast receiver 700 of FIG. 7 takes the timing of the GSM burst into account in softbit generation (or reliability information generation). Based on the cellular transmission activity signal (GSM_TX_ACTIVE) obtained, for example, from a dedicated signaling pin in the GSM transmitter, a scaling factor calculating block 725 calculates a scaling factor K. Softbits calculated in block 640 are scaled by this scaling factor K in block 745, and are used for error correction. The error correction after the softbit generation is performed in the channel decoder 660, and may be carried out, according to an embodiment, in a decoding chain containing three phases. In the first phase, the softbits are input to a Viterbi decoder and are used to perform a Viterbi (convolutional) decoding algorithm. In the second phase, a first Reed Solomon decoding (e.g., a 188/204 Reed Solomon code) is applied to the data. In the third phase, MPE-FEC (MultiProtocol Encapsulation Forward Error Correction) decoding is applied to the data.

In case the broadband broadcast receiver 700 comprises a Multiple Input Multiple Output (MIMO) decoder, the scaling by K can alternatively be done inside a MIMO decoding block (not shown). Yet alternatively, the scaling can be done by scaling the symbols right after the MIMO decoding block.

In an embodiment, the reliability of the bits (softbits) is scaled according to the amount of the lost (or interfered) part of the OFDM symbol. The scaling factor is the same for all the carriers in one OFDM symbol. In an alternative embodiment, the effect of the interfering burst transmission is calculated separately for each carrier resulting in carrier specific scaling factor(s).

Figure 8:
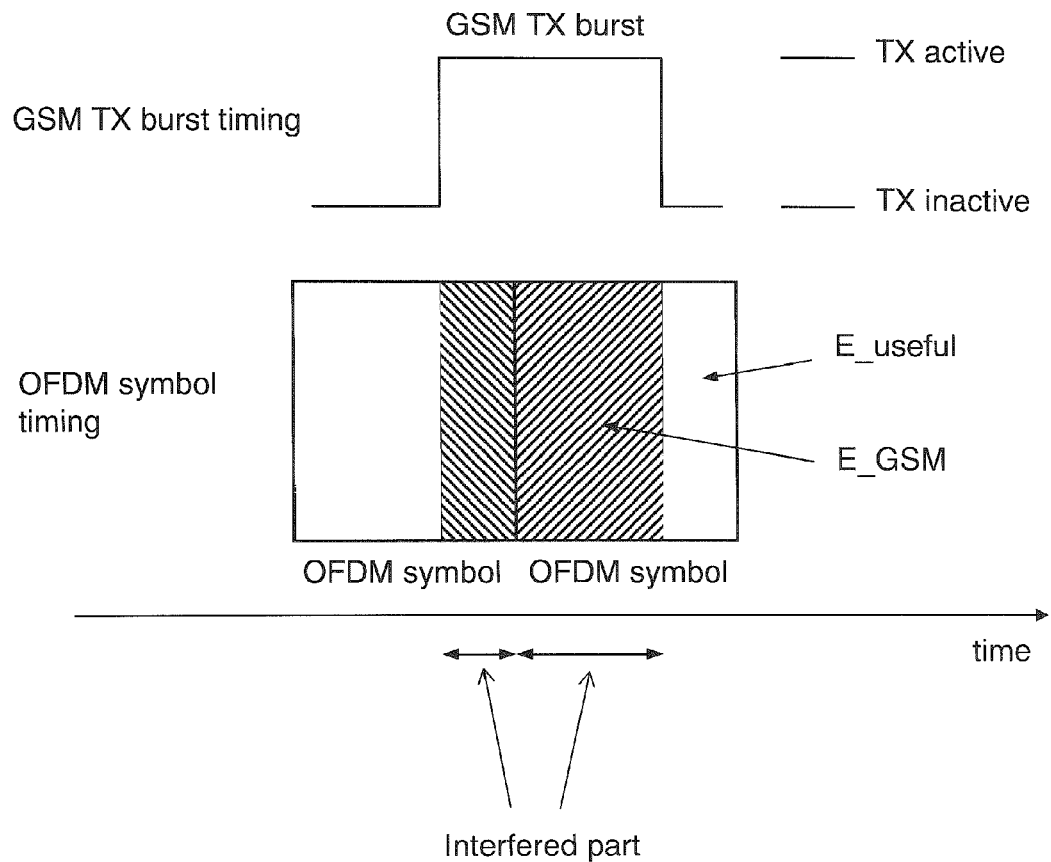
FIG. 8 illustrates reliability information scaling in accordance with an embodiment.

FIG. 8 illustrates reliability information scaling in accordance with an embodiment. GSM transmission (TX) burst timing in relation to the OFDM symbol timing is presented. The scaling factor K relates to the useful part (or uninterfered portion) of an OFDM symbol in proportion to the whole OFDM symbol. In an embodiment, the scaling factor K is calculated as follows:

$$K = E\_useful / (E\_useful + E\_GSM),$$

where E_useful is the energy of the OFDM symbol in the useful part and E_GSM is the energy of the symbol in the unreliable (or interfered) part. Accordingly, there is no scaling (K=1), when E_GSM=0. In other words, when the GSM transmitter is not active (TX inactive), there is no interference in this meaning and softbits may be considered reliable. On the other hand, when GSM transmission blocks the whole symbol (TX active; E_useful=0) it is considered that the bits do not carry any information (K=0). In a practical case, the scaling factor is between these two extremes. Depending on whether time interleaving has been done on the digital broadband broadcast transmitter's side, time deinterleaving is either performed or not performed in the broadband broadcast receiver 700.

When the cellular transmission interferes the simultaneous digital broadband broadcast reception, data loss may occur. As mentioned in the preceding, an embodiment provides for an error correction chain (for DVB-H in particular) comprising a Viterbi (convolutional code) decoding, a first Reed Solomon (e.g. 188/204) decoding and a second Reed Solomon (MPE-FEC) decoding. A code rate states what portion of the total amount of data/information is useful (i.e., non-redundant). Viterbi decoding has different code rate options: 1/2, 2/3, 3/4, 5/6 and 7/8. The first Reed Solomon code has a fixed code rate, e.g. 188/204. For the MPE-FEC the code rate may be selected more freely via puncturing and padding. In an embodiment the code rate in MPE-FEC is 3/4.

In order to recover from data loss, in an embodiment, a strong error correction code is applied to the digital data in the channel decoder 660. Here "strong" means that the used error correction code has enough redundancy to recover the lost data and further has enough error correction capacity to recover from "normal" channel errors caused by wireless transmission path. In an embodiment the error correction code is arranged to be programmable, i.e., a strong code is used in case cellular interoperability is required, and a weaker code having less redundancy may be used in cases cellular interoperability is not required. According to an embodiment, in cases where cellular interoperability with the digital broadband broadcast reception is required (e.g., in case the frequencies of the cellular transmission and digital broadband broadcasting are close to each other), a stronger code rate is selected from the available code rate alternatives. For example, in a DVB-H embodiment, the Viterbi decoding code rate can be lowered to make it stronger and to increase redundancy. Alternatively, the code rate of the first Reed Solomon code can lowered or be replaced by a stronger code, for example, a Low-Density Parity-Check (LDPC) code.

When stronger code(s) are needed in the channel decoder, the corresponding code(s) need to be implemented also in the channel encoding blocks in the digital broadband broadcast transmitter. In an embodiment, the digital broadband broadcast transmitter and receiver are provided with an option to select a mode of operation from a set of operating modes, which give different levels of redundancy. This option makes it possible for the transmitter to adjust the redundancy in accordance with an expected interoperability situation. For GSM interoperability problematic transmission frequencies, for example, the transmitter may select an appropriate mode with enough redundancy. The transmitter may signal the selected mode or used error correction code(s) to the receiver (s) by appropriate signaling.

In an embodiment, blanking (i.e., setting ADC output samples to zero) may be used during the cellular transmission (or GSM) burst is in a digital broadband broadcast (or DVB-H) receiver. Also then it is appropriate to add more redundancy in the data to be transmitted by the digital broadband broadcast transmitter in order to better recover the blanked data. Depending on the redundancy, only a part or all of the lost data may be recovered.

Figure 9:
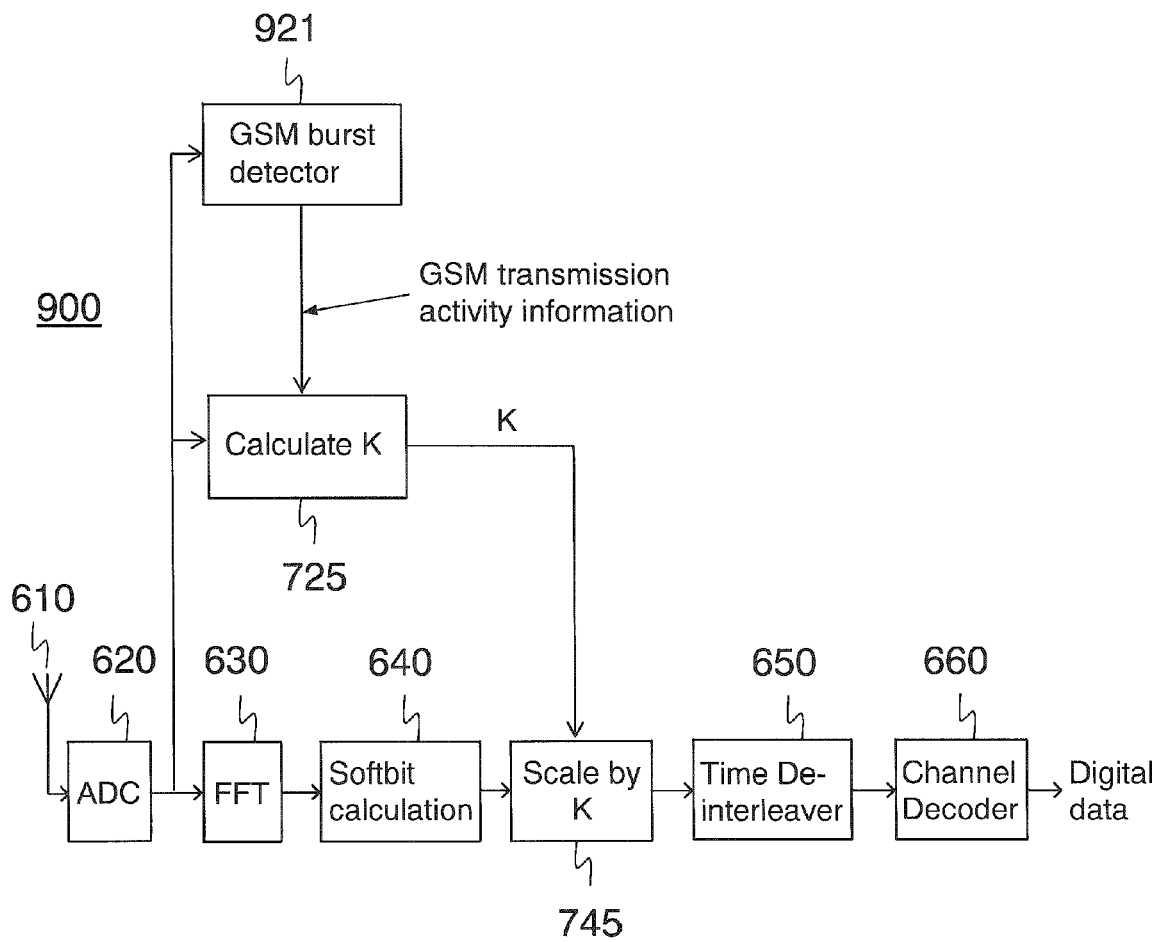
FIG. 9 shows a digital broadband broadcast receiver in accordance with another embodiment.

FIG. 9 shows a modification of the broadband broadcast receiver 700 in accordance with another embodiment. The broadband broadcast receiver 900 of FIG. 9 comprises an energy detector 921 (GSM burst detector 921 in FIG. 9) that is used to detect the timing of the GSM transmission (TX) burst. In this implementation the output of the detector 921 is used instead of said cellular transmission activity signal (GSM_TX_ACTIVE) for detecting GSM transmitter's transmission activity.

Figure 10:
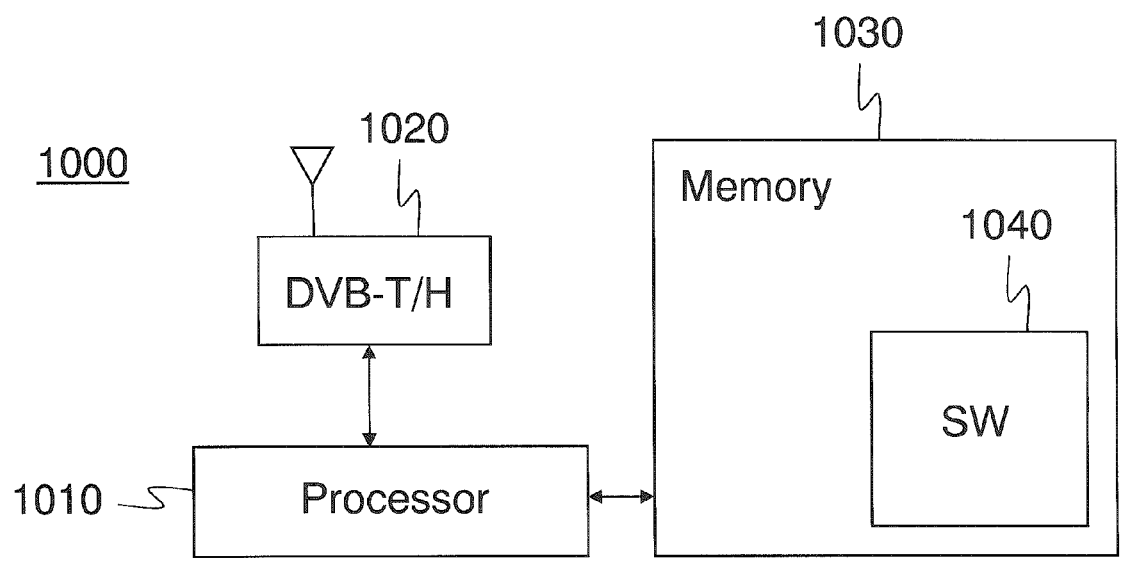
FIG. 10 shows a block diagram of a digital broadband broadcast transmitter in accordance with another embodiment.

FIG. 10 shows selected blocks of a digital broadband broadcast transmitter in accordance with another embodiment. The broadband broadcast transmitter 1000 comprises a processing unit (or processor) 1010, digital broadband broadcast transmission hardware 1020 coupled to the processing unit 1010, and a memory 1030 coupled to the processing unit 1010. The hardware 1020 may be arranged in a plurality of separate hardware blocks or modules. One such a module may be a time interleaver module. In the memory 1030 there is stored digital broadband broadcast transmission software 1040 which is executable in the processing unit 1010. Software 1040 performs software operations relating to digital data transmission, such as controlling time interleaving and other control of hardware modules. In an embodiment, the operations performed by software 1040 may be implemented by suitable firmware in the transmitter apparatus 1000.

Figure 11:
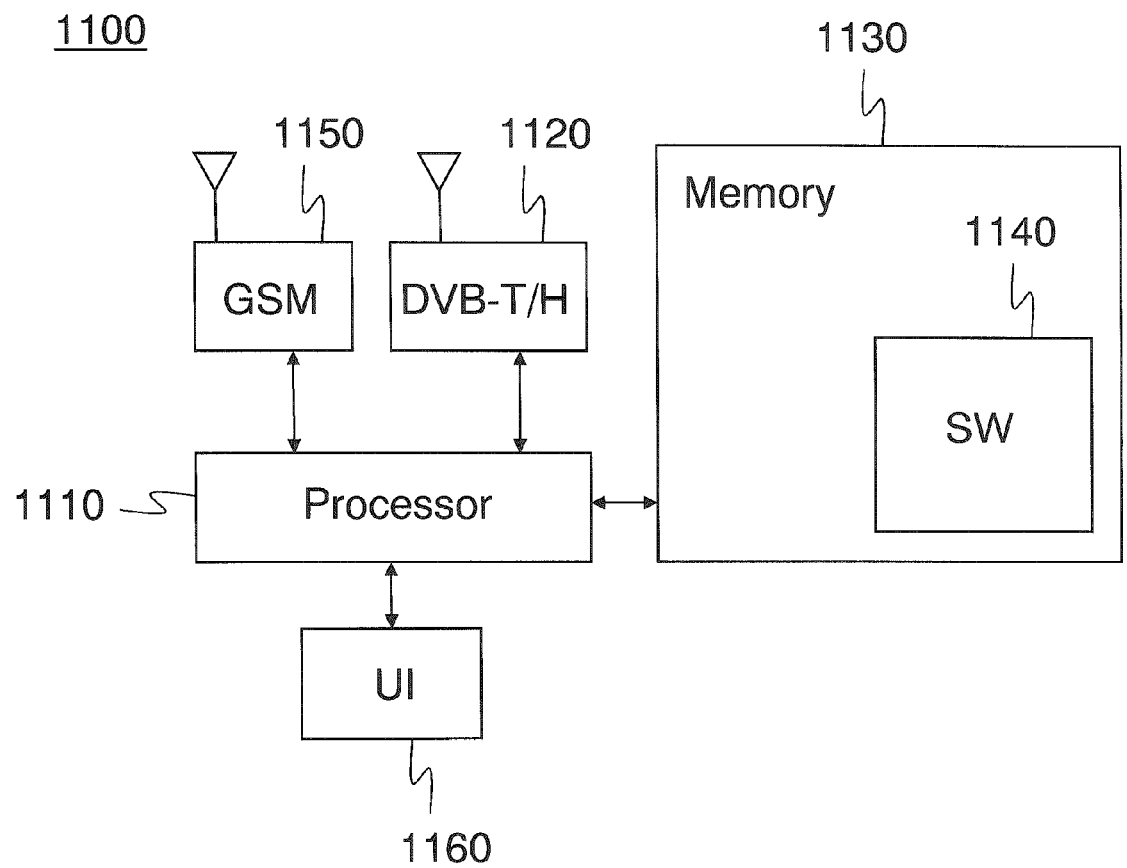
FIG. 11 shows a block diagram of a digital broadband broadcast receiver in accordance with another embodiment.

FIG. 11 shows a simplified block diagram of an apparatus comprising a digital broadband broadcast receiver and a cellular transmitter in accordance with another embodiment. The apparatus may be a user terminal. The apparatus 1100 comprises a processing unit (or processor) 1110, digital broadband broadcast reception hardware 1120 coupled to the processing unit 1110, cellular transmitter (or transceiver) hardware 1150 coupled to the processing unit 1110, and a memory 1130 coupled to the processing unit 1110. The memory 1130 comprises stored software and/or firmware 1140 which is executable in the processing unit 1010. The hardware 1120 may be arranged in a plurality of separate hardware blocks or modules. One such a module may be a time deinterleaver module. Software 1140 comprises digital broadband broadcast reception software, which performs software operations relating to the digital data reception, such as controlling time deinterleaving, reliability information scaling, error correction and other control of hardware modules. Software 1140 further comprises cellular communications software, which performs software operation relating to the cellular transmission (and reception). The apparatus 1100 further comprises a user interface 1160 enabling the user to use the apparatus 1100. User interface 1160 is coupled to the processing unit 1110 and typically comprises one or more input and output devices. These may contain, for example: a display and speaker(s) for showing, playing or presenting received digital television, digital video, audio or data transmission, a keyboard, a microphone, a speaker and optionally a separate display for cellular voice call and other cellular operation.

Figure 12:
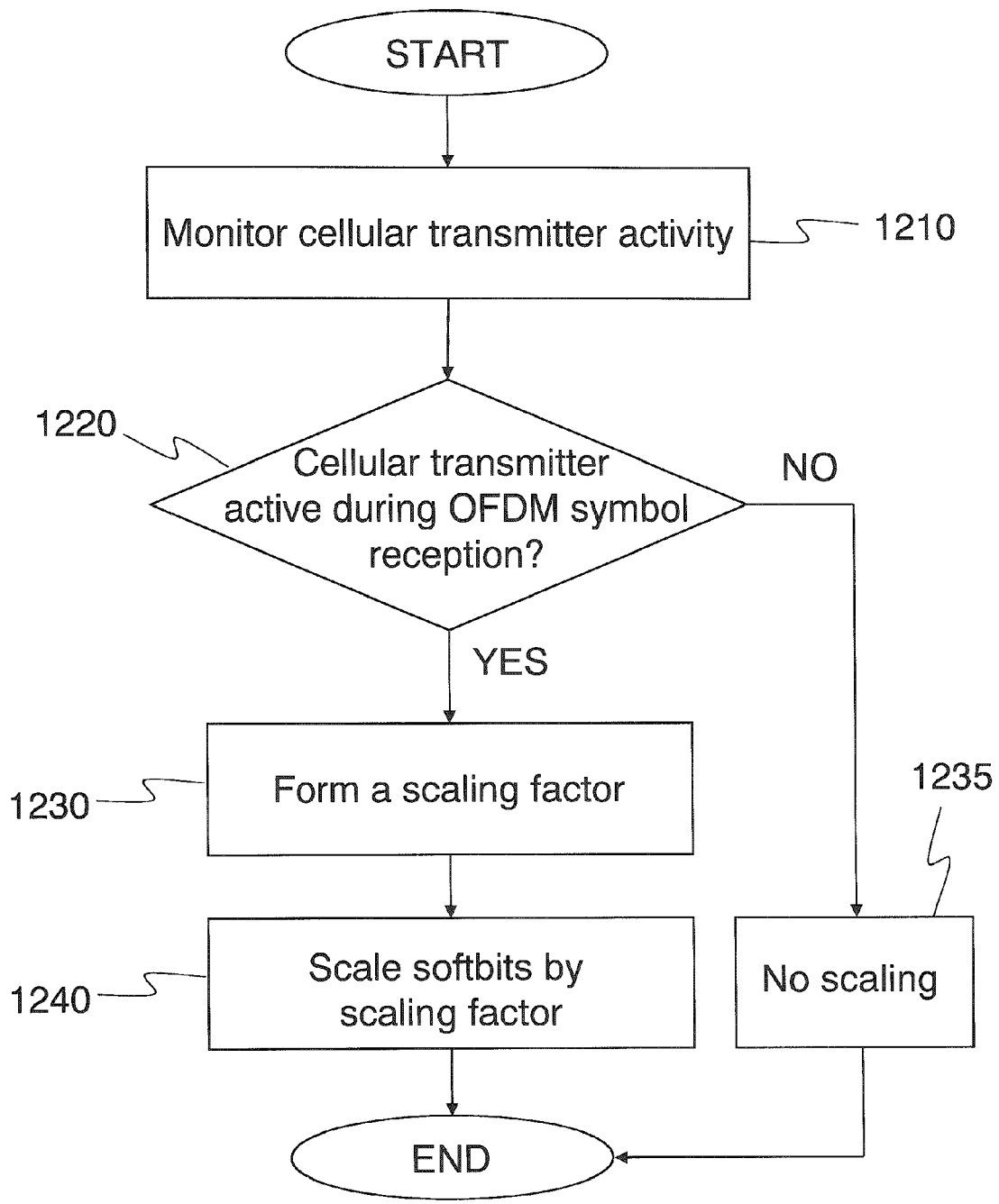
FIG. 12 shows a flow chart of reliability information scaling in accordance with an embodiment.

FIG. 12 shows a flow chart of reliability information scaling in an apparatus comprising a cellular transmitter and a digital broadband broadcast receiver (or an OFDM receiver). The cellular transmitter activity is monitored (step 1210). If no cellular transmitter activity is detected during OFDM symbol reception in step 1220, no scaling of reliability information (step 1235) is performed. If cellular transmitter activity is detected, a scaling factor is formed in step 1230 and reliability information scaling is performed (softbits are scaled by the formed scaling factor) in step 1240.

Figure 13:
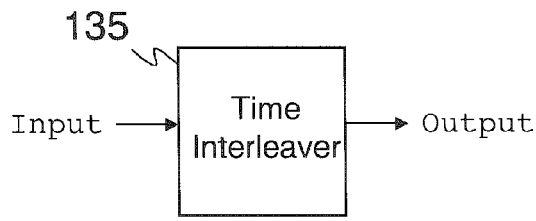
FIG. 13 shows a time interleaver in accordance with an embodiment.

FIG. 13 schematically shows an embodiment of a time interleaver 135. The time interleaver 135 comprises at least one input for receiving digital data to be time interleaved and at least one output for outputting time interleaved digital data. In an embodiment, the time interleaver 135 may be implemented by a convolutional interleaver. In another embodiment, the time interleaver 135 may be implemented by a block interleaver. A corresponding convolutional deinterleaver or block deinterleaver is implemented in the broadband broadcast receiver.

Figure 14:
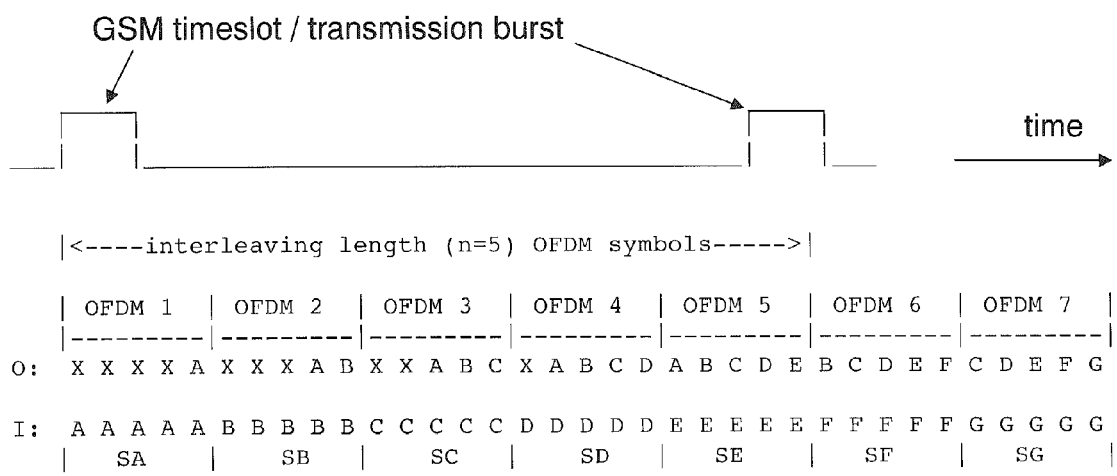
FIG. 14 shows an example of convolutional time interleaving in accordance with an embodiment.

FIG. 14 shows an example of convolutional time interleaving. The data units (i.e., bits, bytes or words) A of an output vector SA of the inner interleaver 130 (FIG. 1) form the input I for the convolutional time interleaver 135, and are interleaved in this example over five OFDM symbols. The interleaving is carried out so that OFDM symbols 1-5 each carry one data unit A from the inner interleaver output vector SA. The OFDM symbols 2-6 each carry one data unit B from the inner interleaver output vector SB, respectively, and so on. The data units X in the output stream O of the convolutional time interleaver 135 denote data units from previous output vectors. A convolutional interleaver and respective a convolutional deinterleaver may be realized in one embodiment using a number of shift registers in parallel.

Figure 15:
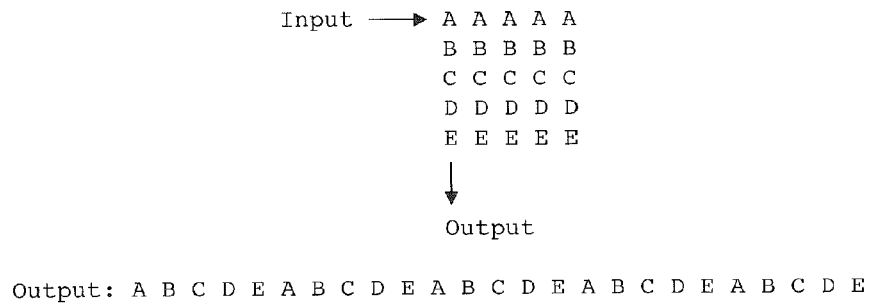
FIG. 15 shows an example of block interleaving in accordance with an embodiment.

FIG. 15 shows an example of block interleaving. The digital data to be interleaved is written row-wise in a matrix and read out column-wise. In other words, data units of a number n (in this example, n=5) of consecutive output vectors of the inner interleaver 130 (which form the input for the block interleaver 135) are written row-wise in a matrix, and the output stream of the block interleaver 135 is formed by reading out the matrix column-wise.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. An apparatus comprising:
   a digital broadband broadcast receiver configured to receive digital data in a plurality of OFDM symbols in a digital broadband broadcast transmission from a digital broadband broadcast transmitter, wherein the digital data is error-correction coded; and
   a cellular transmitter configured to transmit a cellular transmission signal to a cellular network, wherein the apparatus further comprises:
   a time deinterleaver configured to time deinterleave the received digital data, wherein the digital broadband broadcast receiver is configured to detect an interfered part of an OFDM symbol in time domain based on activity of the cellular transmitter and to apply reliability scaling to the digital data in the OFDM symbol in proportion to the amount of interfered part of the OFDM symbol in time domain; and
   a decoder configured to decode the digital data after applying the reliability scaling.

2. The apparatus according to claim 1, wherein the digital data corresponds to at least one orthogonal frequency division multiplexing symbol, and wherein the digital data is time interleaved so that the digital data is spread across more than one orthogonal frequency division multiplexing symbol time.

3. The apparatus according to claim 1, wherein the digital data is time interleaved by using an interleaving length which is at least as long as a transmission cycle of an interfering transmission cycle period.

4. The apparatus according to claim 1, wherein the digital broadband broadcast receiver is configured to use a first code in channel decoding when an interference from a cellular time division multiple access transmission is not expected, and to use another code having additional redundancy to recover at least part of one or more errors, when an interference from a cellular time division multiple access transmission is expected.

5. The apparatus according to claim 1, wherein the cellular transmitter is a GSM or other time division multiple access transmitter, and the digital broadband broadcast receiver is a digital video broadcasting receiver.

6. A method comprising:
   operating a cellular transmitter in an apparatus;
   receiving in the apparatus digital data in a plurality of OFDM symbols in a digital broadband broadcast transmission from a digital broadband broadcast transmitter, wherein the digital data is error-correction coded;
   time deinterleaving the received digital data;
   detecting an interfered part of an OFDM symbol in time domain based on activity of the cellular transmitter;

applying reliability scaling to the digital data in the OFDM symbol in proportion to the amount of interfered part of the OFDM symbol in time domain; and decoding the digital data after applying the reliability scaling.

7. The method according to claim 6, wherein the digital data corresponds to at least one orthogonal frequency division multiplexing symbol, and wherein the digital data is time interleaved so that the digital data is spread across more than one orthogonal frequency division multiplexing symbol time.

8. The method according to claim 6, wherein the digital data is time interleaved by using an interleaving length which is at least as long as a transmission cycle period of an interfering transmission.

9. The method according to claim 6, comprising:

using a first code in channel decoding when an interference from a cellular time division multiple access transmission is not expected, and using another code having additional redundancy, when an interference from a cellular time division multiple access transmission is expected.

10. A non-transitory computer readable storage medium having stored thereon a computer program executable in an apparatus, the computer program comprising:

program code for operating a cellular transmitter in the apparatus;

program code for receiving in the apparatus digital data in a plurality of OFDM symbols in a digital broadband broadcast transmission from a digital broadband broadcast transmitter, wherein the digital data is error-correction coded;

program code for time deinterleaving the received digital data;

program code for detecting an interfered part of an OFDM symbol in time domain based on activity of the cellular transmitter;

program code for applying reliability scaling to the digital data in the OFDM symbol in proportion to the amount of interfered part of the OFDM symbol in time domain; and program code for decoding the digital data after applying the reliability scaling.

11. The apparatus of claim 1, wherein detecting the activity of the cellular transmitter comprises receiving an indication of the activity of the cellular transmitter.

12. The method of claim 6, wherein detecting the activity of the cellular transmitter comprises receiving an indication of the activity of the cellular transmitter.

* * * * *